United States Patent [19]

Dodson

[11] Patent Number: 4,934,657
[45] Date of Patent: Jun. 19, 1990

[54] GRAPHITE SPIRAL PACKING FOR STUFFING BOX AND METHOD FOR MANUFACTURING THE SAME

[76] Inventor: Garry W. Dodson, Sepco, P.O. Box 854, Pelham, Ala. 35124

[21] Appl. No.: 837,791

[22] Filed: Mar. 10, 1986

[51] Int. Cl.$^5$ .................. F16J 15/20; F16J 15/24; F16K 41/02

[52] U.S. Cl. ..................... 251/214; 264/281; 264/320; 264/321; 277/102; 277/105; 277/167; 277/203; 277/204; 277/213; 425/DIG. 7; 425/DIG. 47

[58] Field of Search ............. 29/156.6; 264/281, 339, 264/334, 321, 320, 325, 299, 103; 425/DIG. 7, DIG. 47; 277/204, 102, 105, 167, 203, 205, 213; 156/173, 175, 190, 191, 192, 195, 169; 251/214

[56] References Cited

U.S. PATENT DOCUMENTS

| | | |
|---|---|---|
| 394,990 | 12/1888 | Morgan . |
| 516,874 | 3/1894 | Murphy . |
| 746,375 | 12/1903 | DuPont . |
| 1,307,901 | 6/1919 | Farland et al. . |
| 1,543,963 | 6/1925 | Walton ........................ 277/204 X |
| 1,601,381 | 9/1926 | Thompson ..................... 277/203 |
| 2,167,811 | 8/1939 | Martin ........................ 277/203 X |
| 2,689,145 | 9/1954 | Magos et al. . |
| 2,776,154 | 1/1957 | Leistensnider . |
| 3,136,568 | 6/1964 | Ragsdale . |
| 3,404,061 | 10/1968 | Shane et al. . |
| 3,490,775 | 1/1970 | Henshaw . |
| 3,873,106 | 3/1975 | Pastelak . |
| 4,068,853 | 1/1978 | Schnitzler . |
| 4,127,277 | 11/1978 | Owen et al. ................... 277/204 |
| 4,157,833 | 6/1979 | Kozlowski . |
| 4,157,835 | 6/1979 | Kahle et al. ................... 277/204 X |
| 4,239,245 | 12/1980 | Giglio et al. . |
| 4,305,567 | 12/1981 | Lunt . |
| 4,308,228 | 12/1981 | Kramer, Sr. et al. ........... 264/320 X |
| 4,434,121 | 2/1984 | Schaper . |

FOREIGN PATENT DOCUMENTS 3441904 6/1985 Fed. Rep. of Germany ...... 264/281

OTHER PUBLICATIONS

The Sepco Mechanical Packings Program Brochure, 13 pages, printed 1/85, by Sealing Equipment Products Co., Inc.

Primary Examiner—Allan N. Shoap
Attorney, Agent, or Firm—Cushman, Darby & Cushman

[57] ABSTRACT

A helical spacer, e.g. made of stiffly flexible nylon and having flat axially-presented surfaces, in slid onto a cylindrical mandrel, e.g. a die inside body. Flexible corrugated ribbon of expanded graphite is helically wound onto the mandrel between turns of the spacer. This assembly is placed in a tubular die outside body and tubular punches are run into the die outside body, and moved axially towards one another telescopically of the mandrel. The punches, engaging opposite turns at ends of spacer axially compress and radially expand the helix of graphite, raising its density and producing a product which, in transverse cross-section, closely resembles conventional pre-formed stuffing box packing rings made of the same ribbon starting material. The helical graphite packing stock is disassembled from the spacer and mandrel by rotation, and supplied to the trade. In use, some of the stock is telescoped onto a valve stem, or a mandrel of the same diameter as the valve stem, and cut to length, e.g. using a pen knife. In this way, one stock of packing material can serve valve stems of a range of sizes.

14 Claims, 2 Drawing Sheets

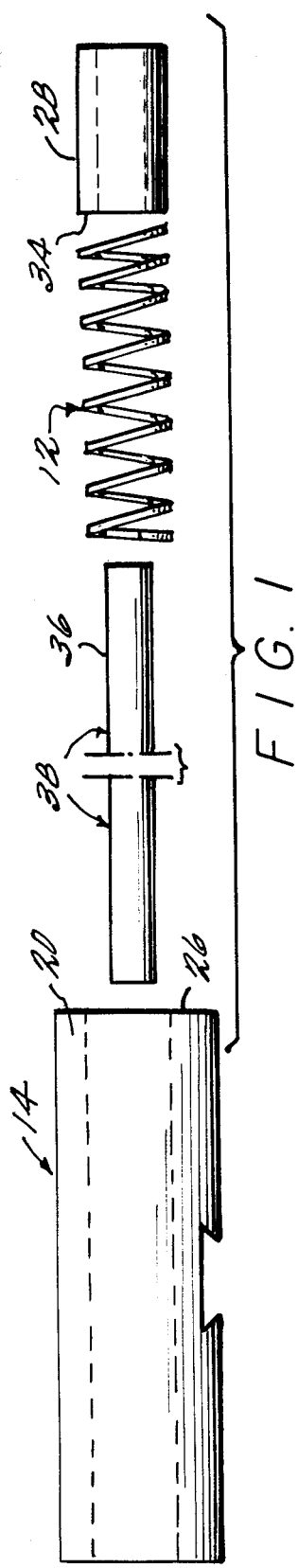
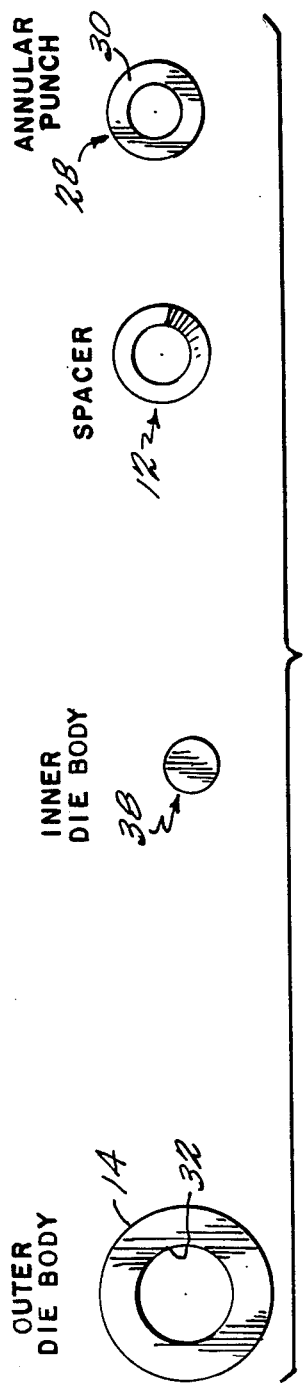
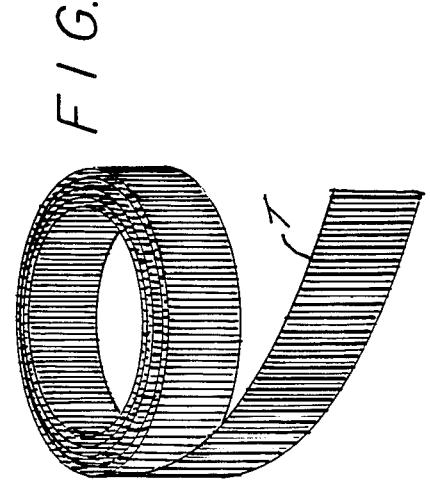
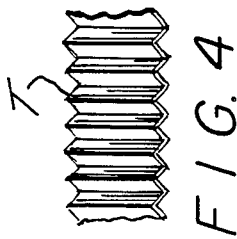
FIG. 1
FIG. 2
FIG. 3
FIG. 4

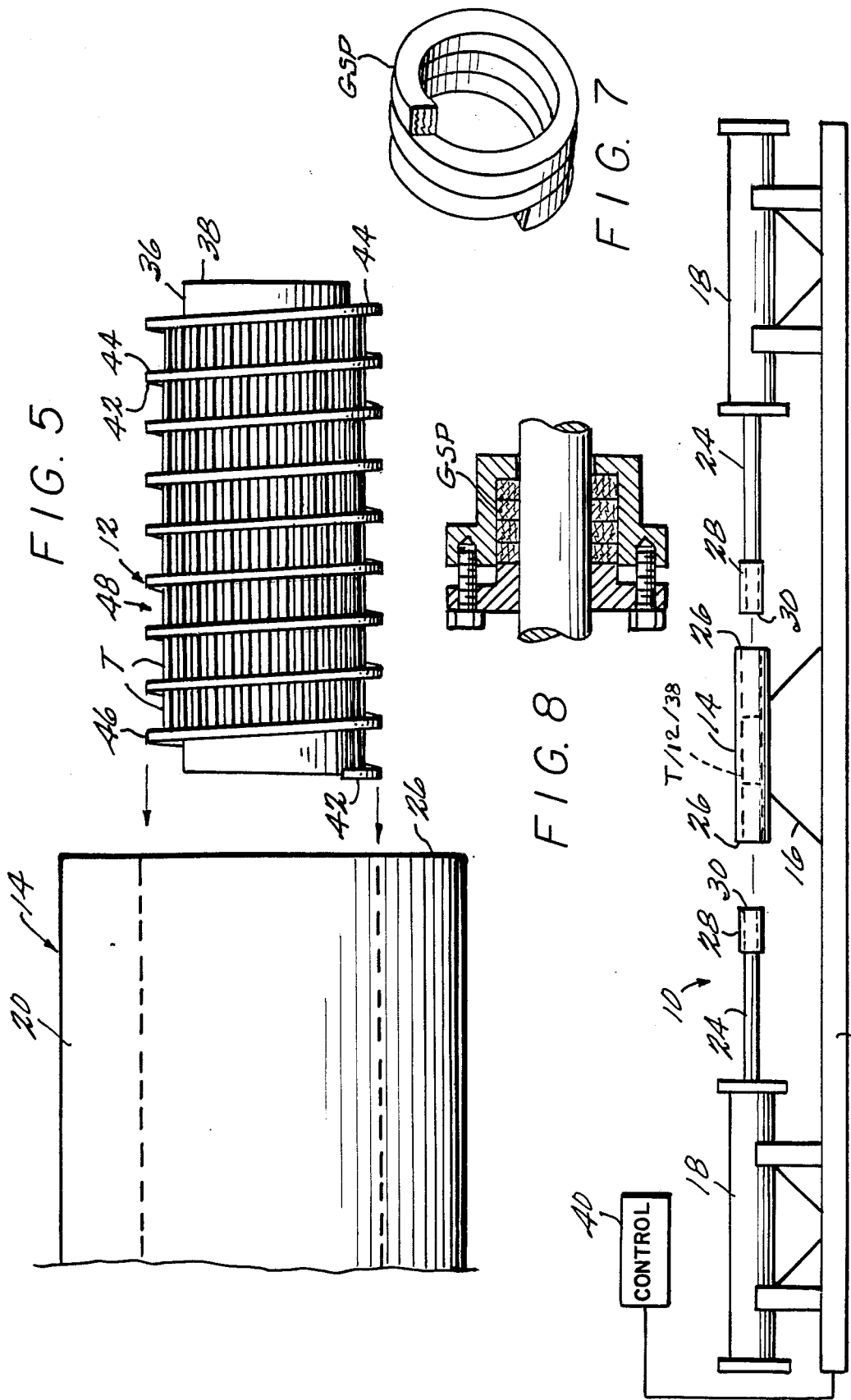

GRAPHITE SPIRAL PACKING FOR STUFFING BOX AND METHOD FOR MANUFACTURING THE SAME

BACKGROUND OF THE INVENTION

The Shane et al. U.S. Pat. No. 3,404,061, issued Oct. 1, 1968 discloses a flexible ribbon or tape of expanded (foamed) graphite which neither includes a binder nor a coating. This material, both in flat and transversally corrugated form is available in a variety of widths and thicknesses, e.g. one-quarter to one inch wide and 0.005–0.020 inch from Union Carbide Corporation, under the trademark Grafoil ®. In its least dense form the sheets of the graphite foam have a density somewhat less than 5 pounds per cubic foot. The foamed material can be compressed to a density of about 137 pounds per cubic foot without resorting to extreme measures. The flexible corrugated tape, as presently commercially available has a density which is intermediate this range. A typical use of the flexible graphite tape product, particularly in its corrugated form, is wrapped and compressed in situ stuffing box seals. The bulk density of the corrugated tape when it is wrapped convolutely about a valve stem or other shaft is sufficiently low that a convolute wrap that is approximately equal in thickness to the width of the packing chamber of a stuffing box, can be axially compressed by about 50 percent as the packing gland is tightened to the requisite degree. As the packing ring thus being formed is compressed, the internal space within it and the voids in the foam are correspondingly extinguished, providing a ring the internal and external diameters of which match those of the packing chamber. As the convolute wrapping of tape is crumpled by axial compression as the packing gland is tightened, the individual layers tend to become zig-zagged in transverse cross-section, especially within the bulk of the resulting packing ring. Such a packing ring and method for manufacturing it in situ are disclosed in the Schnitzler U.S. Pat. No. 4,068,853.

Because the preferred material used in making the product of the present invention is the flexible, expanded graphite tape mentioned above, and an important contemplated use of the product of the present invention is stuffing box packing, the entire disclosure of the abovementioned Shane et al and Schnitzler patents are incorporated herein by reference.

Presently, flexible graphite is a preferred material for making high temperature valve stem packing for high pressure steam service, such as in nuclear-powered electric generating plants. There are other, comparable uses for which sealing materials made of flexible graphite are preferred in the trade. So far as the present inventor is aware, until the present invention was made, flexible graphite has been provided to the trade, for sealing usage, in the following forms: as sheets, as ribbons and as die-formed rings.

It is understood that the basic flexible graphite product is foamed sheet of various thicknesses. This basic sheet product is cut into various lengths and widths to provide the sheet product that is sold, which is used as gasket material. The basic sheet product is slit into strips of various widths and preferably run through corrugating rolls to provide the ribbon, strip product that is sold. And the strip is convolutely wound onto mandrels and die-molded to produce rings of various internal diameters, various sizes and proportions of generally rectangular transverse cross sectional shape, and various thicknesses.

Although the stem packing products made of flexible graphite, both in strip form and in pre-formed ring form are well received in the marketplace and have an excellent reputation, there are drawbacks to their use which the present inventor believes have significantly constrained market penetration of this excellent stem packing material.

As to the corrugated flexible graphite ribbon, it is rather difficult and time-consuming to install. If a valve packing is leaking on a steam line and needs to be replaced, generally it is necessary to shut-down that line, disassemble the stuffing box, pull out the worn packing and inspect it for any unusual signs apart from normal wear. Then, the maintenance personnel must determine the amount of corrugated flexible graphite ribbon needed, e.g. using the formula, $$L = 3.7(A - B)C/W$$

in which:
- L = length of ribbon, in feet,
- A = stuffing box I.D., in inches,
- B = shaft O.D., in inches,
- C = stuffing box depth, in inches, and
- W = initial width of ribbon, in inches.

From the ribbon stock, a piece is unrolled and cut to the determined length L. Next, this piece is convolute wound around a mandrel the same O.D. as the shaft, or directly on the shaft and slipped into the stuffing box. Normally, a stuffing box is much deeper than the width of the ribbon stock, so it is necessary to axially compress this first wound pile of ribbon, in place, to approximately half its initial thickness, and then to repeat the foregoing steps on successive lengths of corrugated flexible graphite ribbon stock, until the stuffing box is full to the requisite depth, e.g. two-thirds to three-quarters full, whereupon the packing gland, bonnet, other seals, retainers, anti-extrusion ring, etc., are reinstalled and the respective line tested and placed back in service. In many cases, it is not feasible to take the steam line out of service for a long enough time to permit the valve to cool down to a comfortable working temperature, and so the above-described steps often must be carried out while the valve is still very hot. The procedure for changing valve stem packing using corrugated ribbon to make rings in situ is lengthy, stressful and costly. Maintenance personnel tend to praise the performance of the graphite stem packing material in high temperature steam service, but to dread having to perform a stem packing change using the ribbon, as just outlined.

Until now, pre-formed graphite stem packing rings, factory-made from corrugated Grafoil ribbon, has been the most convenient form of the product, but it has also been by far the most expensive form of the product, so far as material cost is concerned. A typical electrical power generating plant (or comparable industrial plant) has hundreds of valves, in an assortment of sizes. While many of the valves may require the same cross-sectional size and shape of packing, the O.D. of the valve stems will vary from valve to valve depending on the diameter of pipeline that the valve serves, and depending upon which manufacturer made the valve. Therefore, a plant that determines to rely on pre-formed rings in order to limit labor and downtime costs necessarily incurs the cost of stocking expensive pre-formed rings in all the sizes they will need.

SUMMARY OF THE INVENTION

A helical spacer, e.g. made of stiffly flexible nylon and having flat axially-presented surfaces, is slid onto a cylindrical mandrel, e.g. a die inside body. Flexible corrugated ribbon of expanded graphite is helically wound onto the mandrel between turns of the spacer. This assembly is placed in a tubular die outside body and tubular punches are run into the die outside body, and moved axially towards one another telescopically of the mandrel. The punches, engaging opposite turns at ends of spacer axially compress and radially expand the helix of graphite, raising its density and producing a product which, in transverse cross-section, closely resembles conventional pre-formed stuffing box packing rings made of the same ribbon starting material. The helical graphite packing stock is disassembled from the spacer and mandrel by rotation, and supplied to the trade. In use, some of the stock is telescoped onto a valve stem, or a mandrel of the same diameter as the valve stem, and cut to length, e.g. using a pen knife. In this way, one stock of packing material can serve valve stems of a range of sizes.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 1 is an exploded side elevational view of the die parts for making graphite spiral packing for stuffing boxes in accordance with principles of the present invention;

FIG. 2 is an exploded end elevational view thereof;

FIG. 3 is a perspective view of the flexible expanded graphite corrugated ribbon starting material for making the packing of the present invention;

FIG. 4 is a larger-scale fragmentary perspective view thereof;

FIG. 5 is a fragmentary side elevational view of the ribbon helically wound between turns of the spacer on the mandrel to provide an assembly which is about to be axially slid into the tubular outside body of the die;

FIG. 6 is a side elevational view of the forming press including the assembled die;

FIG. 7 is a perspective view of graphite spiral packing material made in accordance with principles of the present invention; and FIG. 8 is a fragmentary longitudinal cross-sectional view of a valve showing its stuffing box provided with graphite spiral packing in accordance with principles of the present invention.

DETAILED DESCRIPTION

The press assembly 10, but for the provision of the helical spacer 12, may be similar to or the same as that conventionally used in the manufacture of the pre-formed graphite/polytetrafluoroethylene rings of Lunt, U.S. Pat. No. 4,305,567, issued Dec. 15, 1981. This press assembly is shown comprising a tubular die outer body 14 keyed to be supported on a stand 16 spacedly juxtaposed intermediate two hydraulic cylinders 18. The latter have casings 20 fixed on a foundation 22 and are oriented to thrust their piston rods 24 axially towards and away from respective opposite open ends 26 of the die outer body 14. The protruding end of each piston rod 24 is fitted with a punch 28 having an annular working end portion 30. Each piston rod 24 is adapted to be projected sufficiently to place its working end of its punch at an intermediate location within the bore 32 of the die outer body 14, and to be retracted sufficiently to withdraw its working end portion out of a telescopic relationship with the die outer body.

By preference, the free end 34 of each punch 28 is planar, extends at a right angle to the longitudinal axis of the respective piston rod 24, has an O.D. nearly as great as the I.D. of the bore 32 of the die outer body 14, and has an I.D. that is only slightly greater than the O.D. of the circular-sectioned outer peripheral surface 36 of the cylindrical die inner body 38.

The hydraulic system (not shown in detail) for the cylinders 18 preferably includes a common control 40 which can be operated to simultaneously thrust the two piston rods 24 towards one another by like amounts and to a sufficient extent, and which can be operated to retract the piston rods 24 away from one another sufficiently to cause the punches to clear the ends of the die outer body. Preferably the control also includes a provision for performing an operating sequence according to which after the molding operation has been completed, one of the piston rods is thrust further, as the other retracts, in order to push the spacer 12, graphite spiral packing product and die inner body at least part way out of the die outer body so they are exposed for easy removal, and then fully retracts. (As should be apparent, it would be possible to unite the die inner body 38 with one of the piston rods 24 for movement therewith.)

As shown, the die inner body 38 is a solid cylinder, its external surface 36 having a diameter that is equivalent to a common size of valve stem, or that is at a generally median value for a given cluster of valve stem diameters.

The spacer 12 is an element not found in conventional apparatus for manufacture of pressed foamed graphite packing rings. By preference the spacer 12 is made from a relatively incompressible, stiffly flexible material that is stable at pressing temperatures and pressure and which can be easily separated from the product at the conclusion of the pressing operation. For a prototype, the spacer 12 has been successfully machined out of nylon bar stock using a type of nylon bar stock that conventionally is used in making rollers for diverse machinery. It is thought possible to make the spacer of other material, e.g. stainless steel, and by other means, such as by helical extrusion, using known techniques and materials.

As shown, the spacer 12 is a helical member having an inner diameter and an outer diameter respectively slightly larger than and slightly smaller than the corresponding dimensions of the annular space between the surfaces 32 and 36 of the press. By preference, the transverse cross-sectional shape of the spacer 12 is substantially rectangular, with all end faces 42, 44 along radii of the spacer, being substantially perpendicular to the longitudinal axis of the spacer. The length along the helix of the spacer 12 is preferably equal to the length of the flexible graphite tapes which will be used therewith, plus another full turn.

In use, a spacer 12 is slid onto a die inner body 38 and its turn-to-turn spacing opened up by axial tensioning of the spacer 12, at least locally, so that a length of corrugated flexible expanded graphite tape T, e.g. Grafoil ribbon can be laid down on the surface 36 of the mandrel 38 as an intercalation between adjoining turns of the helix. Each strip of tape T typically is twelve feet long, and the spacer 12 is sufficiently long that a full turn of helical spacer 12, rather than any tape T is exposed at each end of the spacer/tape/mandrel subassembly. Usually, more than one thickness of tape T will be laid into the inter-turn space 44 of the helix, e.g. two to twenty layers, with six layers being typical. At the stage where laying-in of the tape T has been completed, the outer surface of the outermost layer of tape will not project radially outwardly beyond the radially outer surface 46 of the helical spacer 12. In fact, generally, the outer surface of the outermost layer of tape T will lie somewhat below the radial level of the outer surface 46, e.g. as depicted in FIG. 5.

The completed spacer 12/tape T/mandrel 38 is slid into the bore 32 of the die outer body 14 and is advanced therein to an intermediate location. Punches 28 of the appropriate size are fitted to the piston rods 24, and the control 40 is operated to slowly advance the annular punches 28 axially towards one another until they have entered respective ends 26 of the bore 32 and have begun to telescope both into the bore 32 and around the outer peripheral surface of the die inner body 38. As the piston rods are projected further, the working ends 30 of the punch 28 contact the outer end surfaces of the respective last turns of the spacer 12 and the spacer 12 begins to be axially condensed, correspondingly axially compressing and radially expanding the helical pile of tape T so as to fill the contracting inter-turn space 48. By preference, the pile of tape T is compressed substantially to the same degree that like tape is compressed in conventional manufacture of rings according to the teachings of the abovementioned patents of Schnitzler and Lunt, e.g. until the turns of the pile of tape T are about half the dimension lengthwise of the mandrel 38 that they initially were, and the piles of tape T have been unified into a graphite spiral packing product GSP that is substantially as coherent and integral as are the conventional pre-formed rings of the Schnitzler and Lunt patents.

The spacer 12/graphite spiral packing product GSP/spacer sub-assembly is then pushed or pulled out of the outer die body, whereupon the spacer 12 may be simply screwed out of the product GSP by helically turning it. Finally, the product GSP can be pushed off one end of the inside body 38 and packaged for shipment, e.g. in a clear plastic tube with plugs at both ends.

All of the equipment, including the spacer 12, is reusable.

At the time when a member of a maintenance staff of a nuclear-powered electrical generating plant or other facility having valves in high temperature service notices a valve that is leaking due to worn packing, the packing renewal procedure is considerably facilitated by the existence of the GSP product of the present invention: the maintenance personnel shut down the line containing the leaking valve, and disassemble its stuffing box, removing and inspecting for unusual clues, the old packing. Assuming no unusual clues are found, indicating that the valve itself should be changed-out, or its stem straightened or replaced, or other known remedial techniques applied, the maintenance personnel measure the depth of packing needed for the stuffing box, select a spiral of GSP product marked as having the proper cross-section and suitable for use on a valve stem having a diameter in the range which includes the diameter of the stem of the leaking valve, slip the spiral on to a mandrel of the same diameter as the valve stem, if it is larger or smaller than the existing inner diameter of the spiral, slightly expanding or contracting the inner diameter of the spiral while so doing, cut-off a piece of the spiral equal to the measured depth, and slide it off the mandrel and onto the valve stem. This spiral piece is then pushed into place and the valve stem package gland is retightened, the reinstallation is inspected and tested, and the line in which the formerly-leaking valve is provided is placed back in service.

While it is presently preferred that the GSP product be made from corrugated Grafoil ribbon that is made of foamed graphite that is substantially free of any binder or coating, other sealing ring materials, e.g. ones made of alternating layers of foamed graphite and polytetrafluroethylene, that can similarly be satisfactorily united into pre-formed spirals of stuffing box packing material or the like could be used.

It should now be apparent that the graphite spiral packing for stuffing box and method for manufacturing the same as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A supply of packing, for the stem of a valve which projects axially into a stuffing box and provided with a packing gland which is securable in place to retain packing in the stuffing box to a selected depth, in an annular space about the valve stem, said supply of packing comprising:
a longitudinally elongated spiral of packing material, this spiral being of substantially uniform transverse cross-sectional shape and constituted by a plurality of helical turns;
said spiral comprising a plurality of axially pre-compressed, radially adjoining layers of graphite, compression-crumpled into a united structure consisting substantially entirely of graphite;
said spiral being sufficiently radially flexible as to permit a length of said spiral, constituted by more than one helical turn thereof, to be conformingly telescopically selectively received on any valve stem having a diameter which falls within a predetermined range of diameters including ones both larger and smaller than a medial diameter.

2. The supply of packing of claim 1, wherein:
said spiral is sufficiently long as to constitute in one piece sufficient packing to fill said stuffing box at least to said depth.

3. The supply of packing of claim 1, wherein:
said spiral is sufficiently long as to constitute in one piece sufficient packing to more than fill said stuffing box to said depth; and
said spiral is adapted to be field-cut to length using a pen-knife.

4. The supply of packing of claim 1, wherein:
said plurality of layers of radially adjoining layers of graphite, compression molded into a united structure, being constituted of a plurality of layers of flexible foamed graphite tape which is transversally corrugated with respect to the length of such tape;

said radially adjoining layers of graphite, compression-crumpled into a united structure having multiple zig-zag interlocking folds extending along the lengths of such layers; and said layers of said united structure being so compressed that they are about one-half the width of said layers of said flexible foamed graphite tape.

5. In a valve having a stem which projects axially into a stuffing box and which includes a packing gland which is secured in place to retain an annular body of packing material in the stuffing box to a selected depth in an annular space about the valve stem, the improvement wherein said annular body of packing comprises:

a longitudinally elongated spiral of packing material, this spiral being of substantially uniform transverse cross-sectional shape and constituted by a plurality of helical turns;

said spiral comprising a plurality of axially pre-compressed, radially adjoining layers of graphite, compression-crumpled into a united structure consisting substantially entirely of graphite;

said spiral being sufficiently radially flexible as to permit a length of said spiral, constituted by more than one helical turn thereof, to be conformingly telescopically selectively received on any valve stem having a diameter which falls within a predetermined range of diameters including ones both larger and smaller than a medial diameter;

said plurality of layers of radially adjoining layers of graphite, compression molded into a united structure, being constituted of a plurality of layers of flexible foamed graphite tape which in transversally corrugated with respect to the length of such tape;

said radially adjoining layers of graphite, compression-crumpled into a united structure having multiple zig-zag interlocking folds extending along the lengths of such layers; and said layers of said united structure being so compressed that they are about one-half the width of said layers of said flexible foamed graphite tape;

said spiral being sufficiently long to constitute in one piece sufficient packing to fill said stuffing box to said depth when said packing gland is secured on said valve.

6. A method for providing a multi-layer spiral of a plastically deformable material, comprising:

providing a mandrel having a generally cylindrical outer peripheral surface;

disposing a spacer of multiple-turn helical form on said mandrel so that the spacer surrounds said mandrel and has an inner peripheral surface thereof juxtaposed with the outer peripheral surface of the mandrel;

axially spreading said spacer so as to provide an inter-turn space extending helically about said spacer;

laying a plurality of lengths of plastically deformable material, one upon another in layers in radial superposition, into said inter-turn space, so that said lengths extend along said space throughout more than one helical turn;

while radially confining said space and said spacer with an outer body, applying compressive force to said spacer at opposite ends thereof so as to compression-crumple said layers into a united structure; and removing said united structure from said spacer.

7. The method of claim 6, wherein:

said lengths of plastically deformable material comprise flexible layers of foamed graphite.

8. The method of claim 7 wherein:

said lengths of plastically deformable material consist essentially of foamed graphite.

9. The method of claim 7, wherein:

said layers of foamed graphite are transversally corrugated, with regard to said lengths of such layers.

10. The method of claim 7, wherein:

said layers of said united structure are so compressed that they are about one-half the width of said layers of foamed graphite prior to such compression crumpling.

11. The method of claim 7, wherein:

said spacer is made of nylon.

12. The method of claim 7, wherein:

said layers are compression-crumpled by projecting two hydraulically-powered annular punches axially towards one another into telescopic relation with said mandrel.

13. The method of claim 12, wherein:

said united structure is removed from said spacer by helically turning said spacer relative to said united structure on said mandrel.

14. The method of claim 6, wherein:

each of said lengths extends along said space throughout a plurality of helical turns and said multi-layer spiral includes a plurality of helical turns.

* * * * *